(12) United States Patent
Ishido

(10) Patent No.: US 8,130,424 B2
(45) Date of Patent: *Mar. 6, 2012

(54) IMAGE SCANNER AND CONTROL METHOD THEREOF

(75) Inventor: Katsuhiro Ishido, Abiko (JP)

(73) Assignee: Canon Kabushiki Kaisha (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/984,150

(22) Filed: Jan. 4, 2011

(65) Prior Publication Data

US 2011/0102868 A1    May 5, 2011

Related U.S. Application Data

(63) Continuation of application No. 11/859,444, filed on Sep. 21, 2007, now Pat. No. 7,903,296.

(30) Foreign Application Priority Data

Sep. 25, 2006   (JP) .................................. 2006-259050

(51) Int. Cl.
*H04N 1/04* (2006.01)

(52) U.S. Cl. ........ 358/474; 358/498; 358/497; 358/500; 271/3.14; 271/264; 399/376; 382/173

(58) Field of Classification Search .................. 358/474, 358/449, 500, 1.13, 498, 497, 496; 271/3.14, 271/264, 225; 399/376; 382/173
See application file for complete search history.

(56) References Cited

U.S. PATENT DOCUMENTS

| 4,908,719 A | 3/1990 | Nonoyama |
| 5,073,794 A | 12/1991 | Kitagawa et al. |
| 5,267,059 A | 11/1993 | Kawabata et al. |
| 5,298,937 A | 3/1994 | Telle |
| 5,402,252 A | 3/1995 | Kojima |
| 5,463,451 A | 10/1995 | Acquaviva et al. |
| 5,652,802 A * | 7/1997 | Graves et al. ................. 382/135 |

(Continued)

FOREIGN PATENT DOCUMENTS

CN    1365230 A    8/2002

(Continued)

OTHER PUBLICATIONS

Office Action issued in corresponding Chinese Patent Application No. 200710153778.6 dated Jun. 12, 2009.

*Primary Examiner* — Negussie Worku

(74) *Attorney, Agent, or Firm* — Rossi, Kimms & McDowell LLP

(57) ABSTRACT

An aspect of the invention provides an image scanner which can continuously transfer image data of one surface to an external device (image forming apparatus) without performing control such as interruption and resumption of an original scanning operation. The image scanner includes a size detection unit which detects an original size and a determination unit which determines whether or not the image data relating to an original of the size detected by the size detection unit can be stored in a storage unit. The image scanner also includes a control unit. The control unit is configured to set operation in a first mode when the determination unit determines that image data relating to the original can be stored in the storage unit, and the control unit is configured to set operation in a second mode when the determination unit determines that image data relating to the original cannot be stored in the storage unit.

6 Claims, 12 Drawing Sheets

U.S. PATENT DOCUMENTS

| | | | |
|---|---|---|---|
| 5,663,611 A * | 9/1997 | Seats et al. | 313/584 |
| 5,687,010 A | 11/1997 | Van Tilborg et al. | |
| 5,789,729 A * | 8/1998 | Yamamoto | 235/470 |
| 5,912,747 A * | 6/1999 | Murakami | 358/497 |
| 6,151,478 A * | 11/2000 | Katsuta et al. | 399/372 |
| 6,233,068 B1 | 5/2001 | Kondo | |
| 6,285,853 B1 | 9/2001 | Sano | |
| 6,333,795 B1 | 12/2001 | Kaji | |
| 6,672,583 B2 * | 1/2004 | Wei | 271/186 |
| 6,721,074 B1 * | 4/2004 | Kao | 358/496 |
| 6,795,160 B2 | 9/2004 | Fukusaka | |
| 6,961,155 B2 | 11/2005 | Sakaguchi | |
| 7,046,953 B2 * | 5/2006 | Hata et al. | 399/367 |
| 7,110,148 B2 | 9/2006 | Hasegawa et al. | |
| 7,123,390 B2 * | 10/2006 | Sato | 358/505 |
| 7,248,378 B2 | 7/2007 | Shiraishi | |
| 7,338,042 B2 | 3/2008 | Shimizu | |
| 7,468,818 B2 * | 12/2008 | Suzuki | 358/498 |
| 7,502,586 B2 | 3/2009 | Shimizu | |
| 7,512,375 B2 * | 3/2009 | Horio | 399/374 |
| 7,567,354 B2 * | 7/2009 | Shirai | 358/1.12 |
| 7,688,477 B2 | 3/2010 | Ikeno et al. | |
| 7,729,023 B2 * | 6/2010 | Morikawa | 358/521 |
| 7,746,523 B2 | 6/2010 | Kim | |
| 7,751,099 B2 * | 7/2010 | Mizuhashi et al. | 358/488 |
| 7,782,498 B2 | 8/2010 | Hoshi | |
| 7,813,005 B2 | 10/2010 | Arai | |
| 7,847,982 B2 * | 12/2010 | Mizumukai | 358/400 |
| 7,969,623 B2 * | 6/2011 | Kagami et al. | 358/498 |
| 2001/0012132 A1 * | 8/2001 | Kaji | 358/474 |
| 2002/0105686 A1 | 8/2002 | Hasegawa et al. | |
| 2003/0107765 A1 * | 6/2003 | Suzuki et al. | 358/1.18 |
| 2004/0001187 A1 | 1/2004 | Fukusaka | |
| 2004/0012825 A1 | 1/2004 | Tesavis | |
| 2004/0057079 A1 | 3/2004 | Ohsawa | |
| 2004/0095594 A1 * | 5/2004 | Moro | 358/1.13 |
| 2004/0190089 A1 | 9/2004 | Tsutsumi | |
| 2005/0206968 A1 | 9/2005 | Sodeura et al. | |
| 2005/0213167 A1 | 9/2005 | Shiraishi | |
| 2005/0254105 A1 | 11/2005 | Muzzin et al. | |
| 2006/0066923 A1 | 3/2006 | Magata et al. | |
| 2006/0181747 A1 | 8/2006 | Takata et al. | |
| 2006/0232833 A1 | 10/2006 | Kim | |
| 2007/0069451 A1 | 3/2007 | Iwago et al. | |
| 2007/0103735 A1 | 5/2007 | Ikeno et al. | |
| 2007/0103740 A1 | 5/2007 | Shingai | |
| 2007/0103741 A1 | 5/2007 | Suzuki | |
| 2007/0183004 A1 | 8/2007 | Jo | |
| 2008/0043294 A1 | 2/2008 | Su et al. | |
| 2008/0068681 A1 | 3/2008 | Ishido | |
| 2009/0244649 A1 | 10/2009 | Shinkawa | |
| 2010/0079827 A1 | 4/2010 | Matsushima | |
| 2010/0103477 A1 | 4/2010 | Lee et al. | |
| 2011/0181926 A1 | 7/2011 | Tokutsu | |

FOREIGN PATENT DOCUMENTS

| | | |
|---|---|---|
| CN | 1471039 A | 1/2004 |
| CN | 1822634 A | 8/2006 |
| JP | 7-283906 A | 10/1995 |
| JP | 11-289420 A | 10/1999 |
| JP | 11-289427 A | 10/1999 |
| JP | 2000-188665 A | 7/2000 |
| JP | 2001-285595 A | 10/2001 |
| JP | 2004-187144 A | 7/2004 |

* cited by examiner

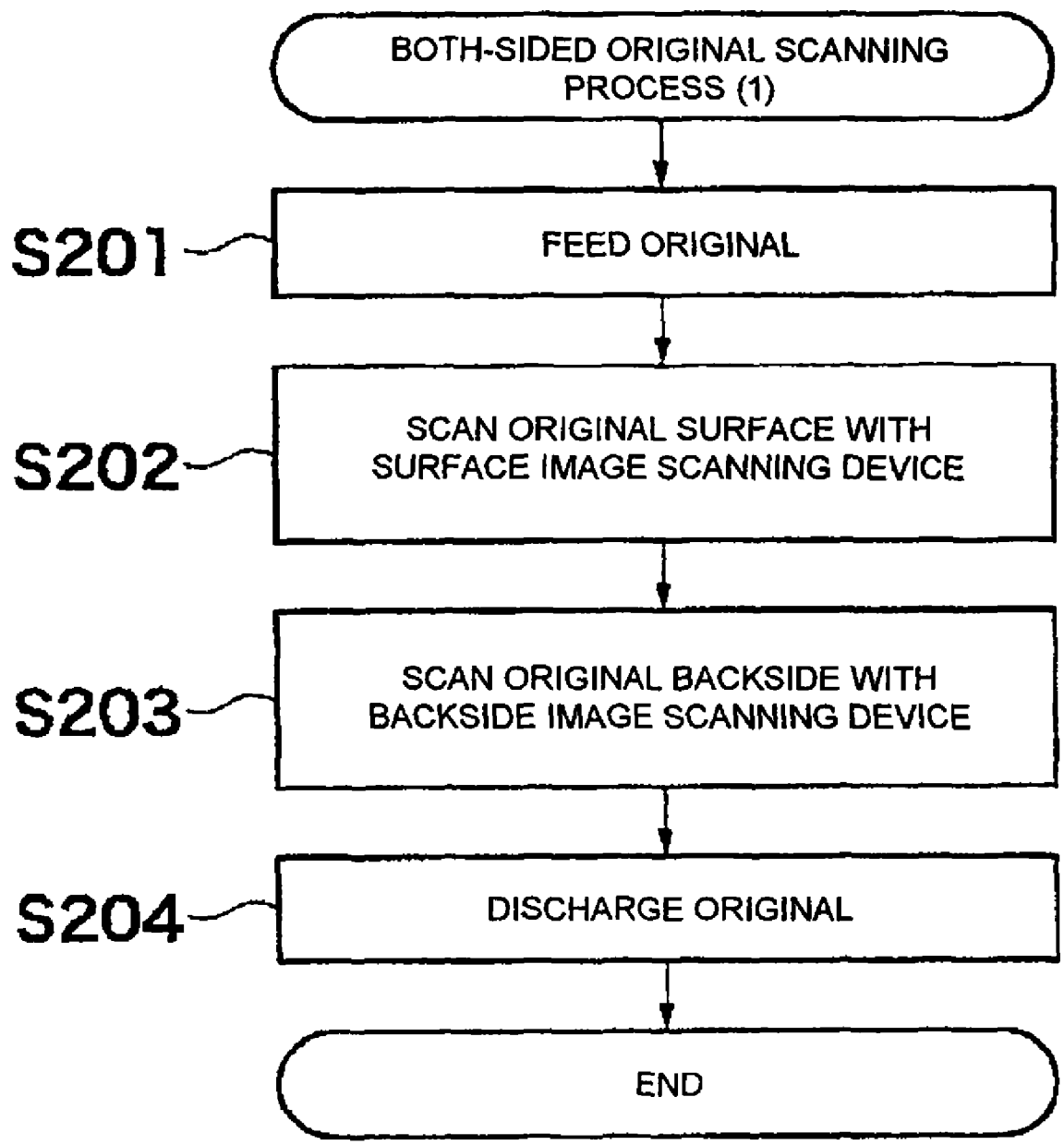

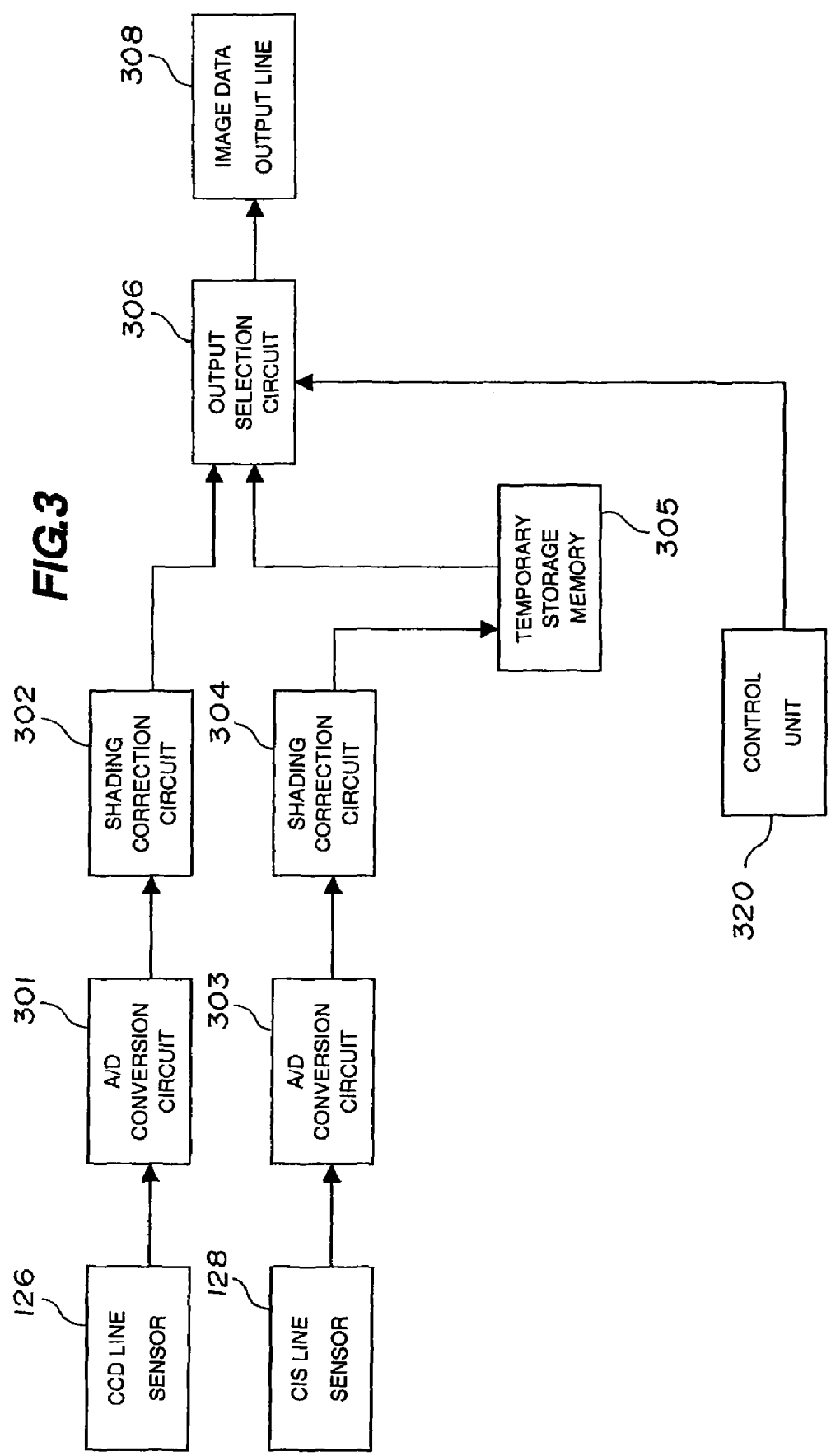

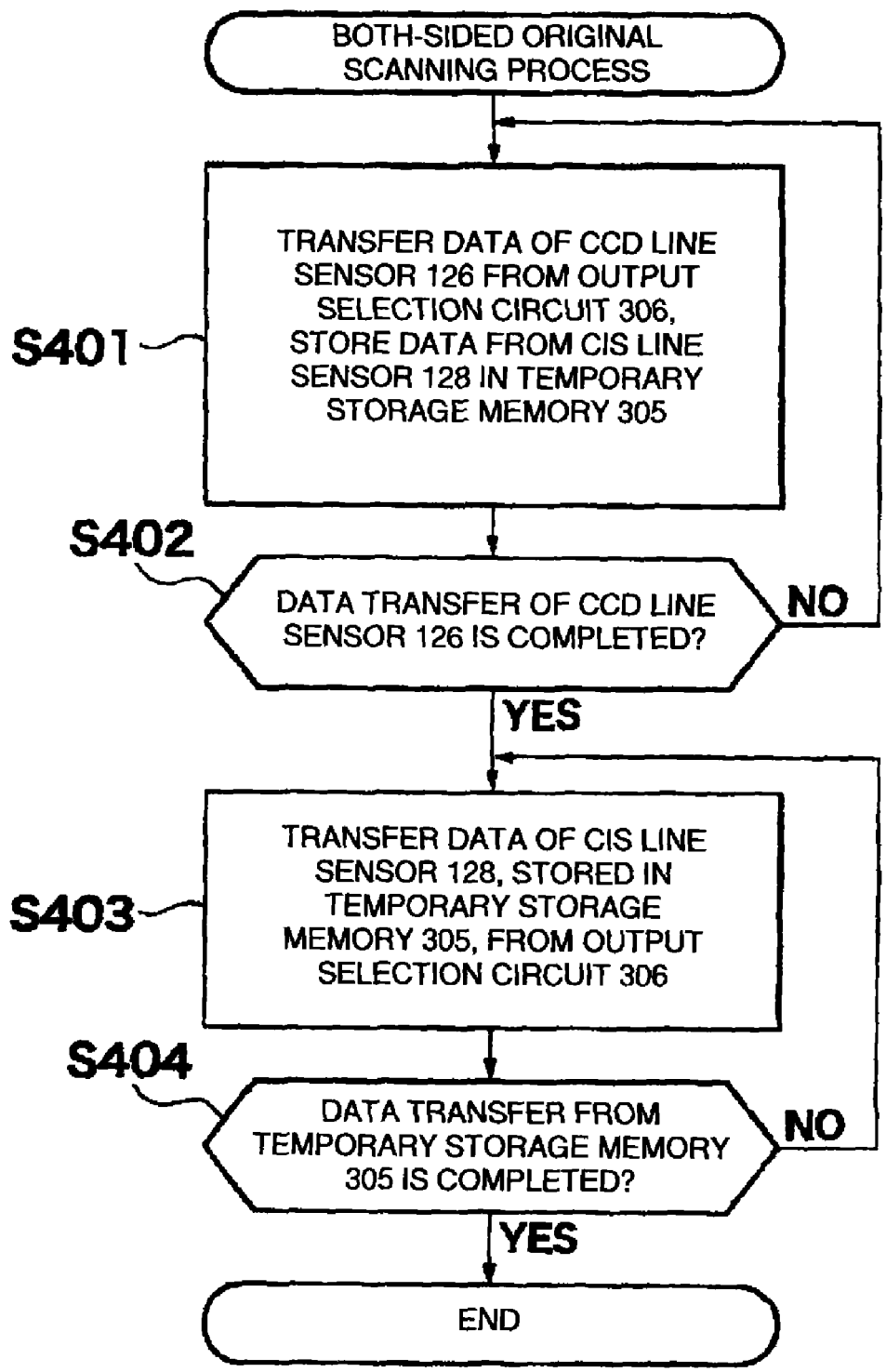

IMAGE SCANNER AND CONTROL METHOD THEREOF

CROSS REFERENCE TO RELATED APPLICATION

This is a continuation of and claims priority from U.S. patent application Ser. No. 11/859,444 filed Sep. 21, 2007, the content of which is incorporated herein by reference

BACKGROUND OF THE INVENTION

1. Field of the Invention

The present invention relates to an image scanner of a digital copying machine, a facsimile, a scanner, and the like, particularly to an image scanner having a both-sided simultaneously scanning configuration in which both sides of an original are simultaneously scanned once and a control method thereof.

2. Description of the Related Art

Conventionally, in image scanners used in the copying machine and the like, there is known an image scanner which performs so-called "flow scan". In the flow scan, the original is conveyed onto an original base plate glass one by one by an automatic original-feeding device, and an image of the original is exposed and scanned by an exposure device fixed at a conveyance path of the original. For example, Japanese Patent Application Laid-Open No. 2001-285595 disclosed the flow scan.

Japanese Patent Application Laid-Open No. 2004-187144 disclosed a configuration in which two image-scanning units are provided to improve productivity to scan both the sides of the original at one-time conveyance. Japanese Patent Application Laid-Open No. 7-283906 discloses a data transfer technique in the case of only one image data output line in the configuration in which the two image-scanning units are provided.

When the both-sided simultaneous scan of the original is performed in the configuration in which only one image data output line is provided, it is necessary that scan image data of the backside be stored in a temporary storage memory during scanning the surface of the original.

Usually DRAM is used as the temporary storage memory. For example, it is assumed that the image data is scanned with a 600-dpi line sensor and an A/D conversion circuit converts the image data into digital data while eight bits are set to each of R, G, and B. In this case, because an image data capacity of about 210 Mbyte is required for an A3 original, the large-capacity temporary storage memory is required, which results in a problem of increasing apparatus cost.

In order to solve the problem, for example, Japanese Patent Application Laid-Open No. 11-289427 discloses a control technique in which a scanning operation speed is decreased when the temporary storage memory capacity is run short, the temporary storage memory outputs the image data to an external device, and the scanning speed is returned when the shortage of the temporary storage memory capacity is eliminated.

In the control disclosed in Japanese Patent Application Laid-Open No. 11-289427, the scanning operation is temporarily interrupted when the temporary storage memory capacity is run short, the temporary storage memory outputs the image data to the external device, and the scanning operation is resumed when the shortage of the temporary storage memory capacity is eliminated. Therefore, the reduction of the memory capacity and the cost reduction can be achieved.

However, because the control such as the interruption and resumption of the original scanning operation is required, it is necessary to stop and start up a driving source for conveying the original, which results in a problem in that an image deformation is easily caused.

Because the image data is transferred to the external device before the data scan is completed for the whole of one surface of the original, in the case where continuous handling of the image data of one surface is required on the external device side, there is a problem in that the image data of the one surface cannot continuously be handled unless the external device includes the temporary storage memory.

In view of the foregoing, the invention provides an image scanner which can continuously transfer the image data of the one surface to the external device (image forming apparatus) without performing the control such as the interruption and resumption of the original scanning operation.

SUMMARY OF THE INVENTION

According to a first aspect of the present invention there is provided an image scanner according to claim 1.

In an embodiment, the image scanner comprises a mode specification means configured to specify a color scanning mode or a monochrome scanning mode, and the determination means is configured to determine whether or not image data relating to an original can be stored in the storage means based on a size detected by the size detection means and a mode specified by the mode specification means.

According to a second aspect of the present invention there is provided an image scanner according to claim 3.

According to a third aspect of the present invention there is provided a method according to claim 7.

In an embodiment of the invention the method further comprises the step of specifying a color scanning mode or a monochrome scanning mode, and the determination of whether or not the detected image data from an original of the detected size can be stored in the storage means is based on a size detected in the step of detecting an original size and a mode specified in the step of specifying a color scanning mode or a monochrome scanning mode.

The image scanner of the invention includes the size detection means which detects the original size and the determination means which determines whether or not the image data of the original detected by the size detection means can be stored in the storage means. The image scanner also includes the control means. The control means is configured to set operation in the first mode when the determination means determines that the image data relating to the original can be stored in the storage means, and the control means is configured to set operation in the second mode when the determination means determines that the image data relating to the original cannot be stored in the storage means.

Thus, in the case where it is determined that the image data relating to the original cannot be stored in the storage means, because operation is set in the second mode in which only one of the scanning means is used, the image information from both the two scanning means is never stored in the storage means. Unlike the conventional art, the control such as the interruption and resumption of the original scanning operation is not required. Therefore, the image data of the one surface can continuously be transferred to the external device (image-forming apparatus).

BRIEF DESCRIPTION OF THE DRAWINGS

FIG. 2 is a flowchart illustrating a procedure of a both-sided original scanning process performed by the image scanner of FIG. 1;

FIG. 3 illustrates a block diagram of an image scanner according to a first embodiment of the invention;

FIG. 4 is a flowchart illustrating a general procedure of a both-sided original scanning process performed by the image scanner of FIG. 3;

FIG. 5A shows the original tray with no original loaded on it, FIG. 5B shows the original tray with an A4 sheet loaded on it, FIG. 5C shows the original tray with an A3 sheet loaded on it;

DETAILED DESCRIPTION OF THE PREFERRED EMBODIMENTS

An exemplary embodiment of the invention will be described in detail with reference to the drawings.

Figure 1:
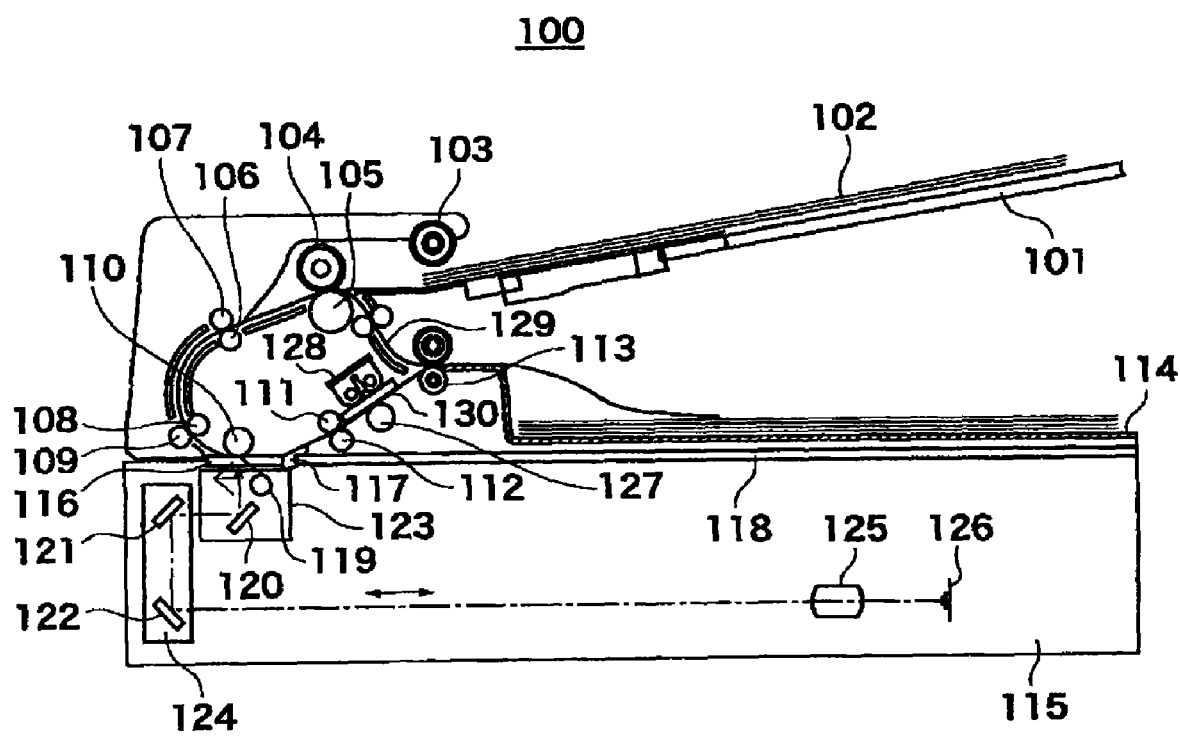
FIG. 1 illustrates a schematic configuration of an image scanner according to an exemplary embodiment of the invention.

FIG. 1 illustrates a schematic configuration of an image scanner according to an exemplary embodiment of the invention.

Referring to FIG. 1, the image scanner includes an automatic original-feeding device 100 and an image-scanner main body 115.

FIG. 2 is a flowchart illustrating a procedure of a both-sided original scanning process performed by the image scanner of FIG. 1.

The configuration of the image scanner of FIG. 1 will be described along with operation of the flowchart of FIG. 2. The image scanner includes a CPU, RAM and ROM (not shown) connected to each other via a bus. Stored in the ROM is a program that, when executed by the CPU is operable to cause the image scanner to carry out the methods described below with reference to FIGS. 2, 4, and 6 to 8. In the second embodiment described below in connection with FIGS. 9 and 10, the program is operable to cause the image scanner to perform the method described with reference to FIG. 10.

In an automatic original-feeding device 100, an original tray 101 stacks originals 102. A sheet-feeding roller 103 is provided above the original tray 101. The sheet-feeding roller 103 is connected to the same driving source as that for a separation conveyance roller 104. As the driving source is rotated, the sheet-feeding roller 103 is rotated to feed the original (Step S201).

Usually the sheet-feeding roller 103 is retracted to an upper position which is of a home position so as not to obstruct an original setting operation. When the original-feeding operation is started, the sheet-feeding roller 103 is lowered to abut on an upper surface of the original 102. Because the sheet-feeding roller 103 is supported by an arm (not shown), the sheet-feeding roller 103 is vertically moved by swing of the arm.

A separation conveyance driven roller 105 is disposed on side opposite the separation conveyance roller 104, and the separation conveyance driven roller 105 is pressed against the separation conveyance roller 104. The separation conveyance driven roller 105 is made of a rubber material whose friction is slightly smaller than that of the separation conveyance roller 104. The separation conveyance driven roller 105 feeds the original while loosening the original 102 fed by sheet-feeding roller 103 one by one in cooperation with the separation conveyance roller 104.

A registration roller 106 and a registration driven roller 107 are used to align leading edges of the originals 102 fed by the separation conveyance driven roller 105. The leading edge of the separated original 102 is caused to abut on a nip portion of the stationary registration roller pair, and a loop is generated in the original 102 to align the leading edge of the original 102. A lead roller 108 and a lead driven roller 109 convey the original 102 toward a flow scan glass 116. A platen roller 110 is disposed on the side opposite a flow scan glass 116.

A CCD line sensor 126 scans image information on the surface of the original 102 passing on the flow scan glass 116 (first scanner portion) (Step S202). When the scan performed by the CCD line sensor 126 is ended for the surface image of the original 102, a lead discharge roller 111 and a lead discharge driven roller 112 convey the original 102 onto CIS line sensor 128.

A jump platform 117 scoops up the original 102 from the flow scan glass 116. A platen roller 127 is disposed on the side opposite the CIS line sensor 128. The CIS line sensor 128 scans the image information on the backside of the original 102 passing on a flow scan glass 130 (second scanner portion) (Step S203). When the scan performed by with the CIS line sensor 128 is ended for the backside image of the original 102, a discharge roller 113 discharges the original 102 to a discharge tray 114 (Step S204).

An image-scanner main body 115 includes a lamp 119 and mirrors 120, 121, and 122. The lamp 119 illuminates the surface of the scanned original. The mirrors 120, 121, and 122 guide the light reflected from the original 102 to a lens 125 and the CCD line sensor 126. The lamp 119 and the mirror 120 are attached to a first mirror unit 123. The mirrors 121 and 122 are attached to a second mirror unit 124.

The mirror units 123 and 124 are coupled with a driving motor (not shown) by a wire (not shown), and the mirror units 123 and 124 are moved in parallel with the original base plate glass 118 by rotation of the driving motor. The light reflected from the original 102 is guided to the lens 125 through the mirrors 120, 121, and 122, and the light is imaged onto a light acceptance portion of the CCD line sensor 126 through the lens 125.

The CCD line sensor 126 performs photoelectric conversion based on the reflected light using a light acceptance element, and the CCD line sensor 126 outputs an electric signal according to an incident light quantity. Similarly, the CIS line sensor 128 performs the photoelectric conversion based on the light reflected from the original 102 using a light acceptance element, and the CIS line sensor 128 outputs an electric signal according to an incident light quantity.

The image scanner having the above configuration has an original fixed scanning mode. In the original fixed scanning mode, the original 102 is placed on the original base plate glass 118 and the original 102 is scanned while the first mirror unit 123 and the second mirror unit 124 are moved in a sub-scanning direction (direction of arrow in FIG. 1).

The image scanner also has a flow scan mode. In the flow scan mode, the motions of the first mirror unit 123 and second mirror unit 124 are stopped, and the original 102 is scanned at positions of the flow scan glasses 116 and 130 while the automatic original-feeding device 100 conveys the original 102. That is, the image scanner can scan the original 102 in the two modes.

FIG. 3 illustrates a block diagram of an image scanner according to a first embodiment of the invention.

Referring to FIG. 3, the image scanner includes an A/D conversion circuit 301 which converts an analog signal from the CCD line sensor 126 into a digital signal.

The image scanner includes a shading correction circuit 302 and an A/D conversion circuit 303. The shading correction circuit 302 performs shading correction to the image data which is converted into the digital value by the A/D conversion circuit 301. The A/D conversion circuit 303 converts the analog signal from the CIS line sensor 128 into the digital signal.

The image scanner includes a shading correction circuit 304 and a temporary storage memory 305. The shading correction circuit 304 performs the shading correction to the image data which is converted into the digital value by the A/D conversion circuit 303. The image data from the CIS line sensor 128, to which the shading correction is performed, is temporarily stored in the temporary storage memory 305.

The image scanner includes an output selection circuit 306. Based on a control unit 320, the output selection circuit 306 selects whether the image data from the CCD line sensor 126 is transferred to an image data output line 308 or the image data from the CIS line sensor 128, stored in the temporary storage memory 305, is transferred to the image data output line 308.

FIG. 4 is a flowchart illustrating a procedure of a general both-sided original scanning process performed by the image scanner of FIG. 3.

Referring to FIG. 4, when the original feeding is started, the image data of the CCD line sensor 126 is transferred from the output selection circuit 306 to the image data output line 308, and the image data from the CIS line sensor 128 is stored in the temporary storage memory 305 (Step S401).

When the transfer of the image data from the CCD line sensor 126 to the image data output line 308 is completed (YES in Step S402), the output selection circuit 306 is switched so that the image data of the CIS line sensor 128, stored in the temporary storage memory 305, is transferred to the image data output line 308 (Step S403). When the transfer of the image data from the CIS line sensor 128 to the image data output line 308 is completed (YES in Step S404), the process is ended.

Figure 5A:
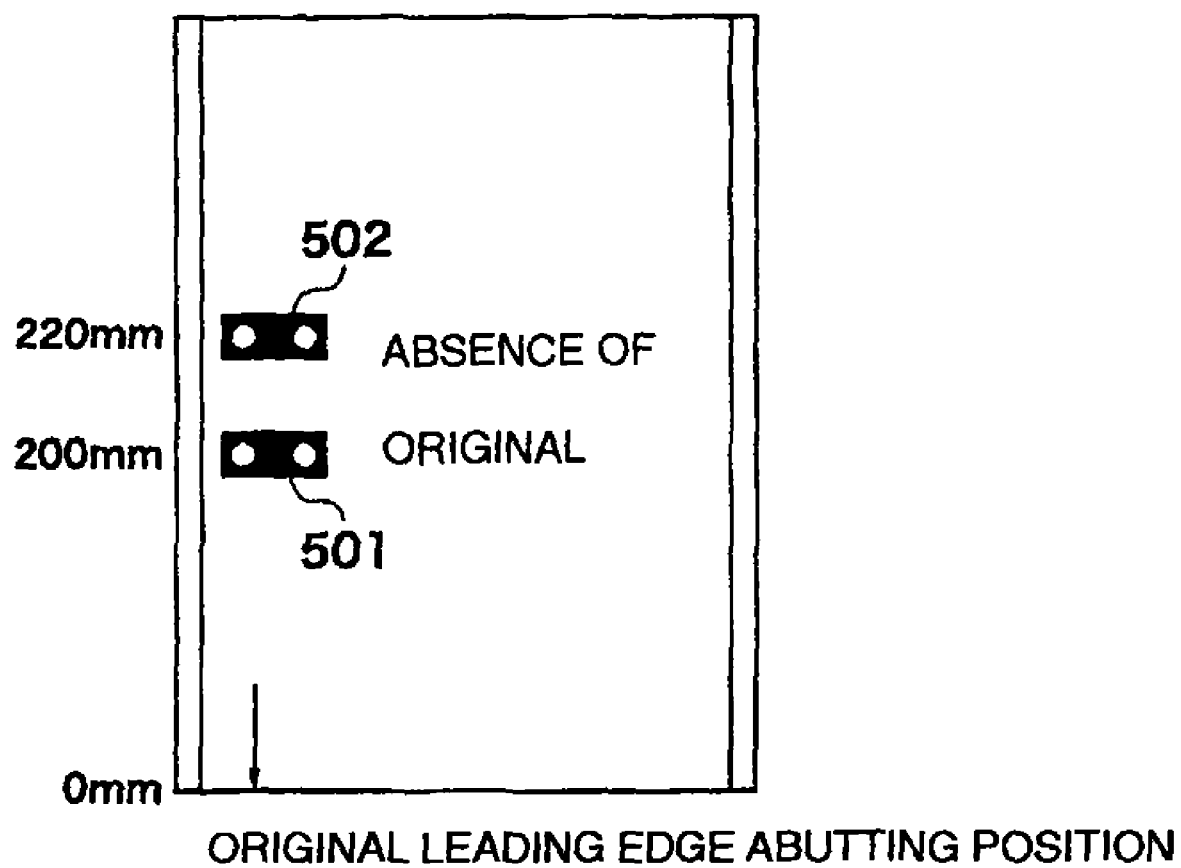
FIGS. 5A to 5C show a top view of an original tray of FIG. 1.
Figure 5B:
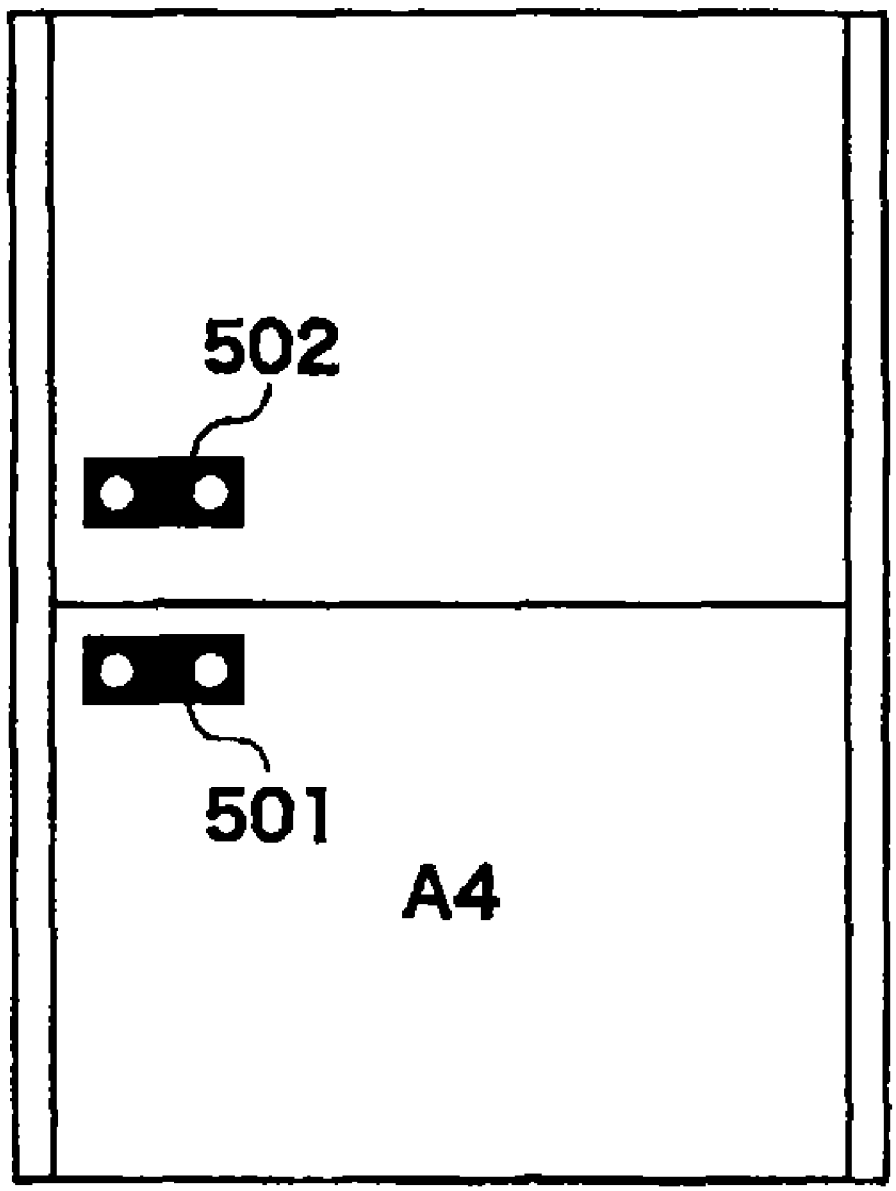
Figure 5C:
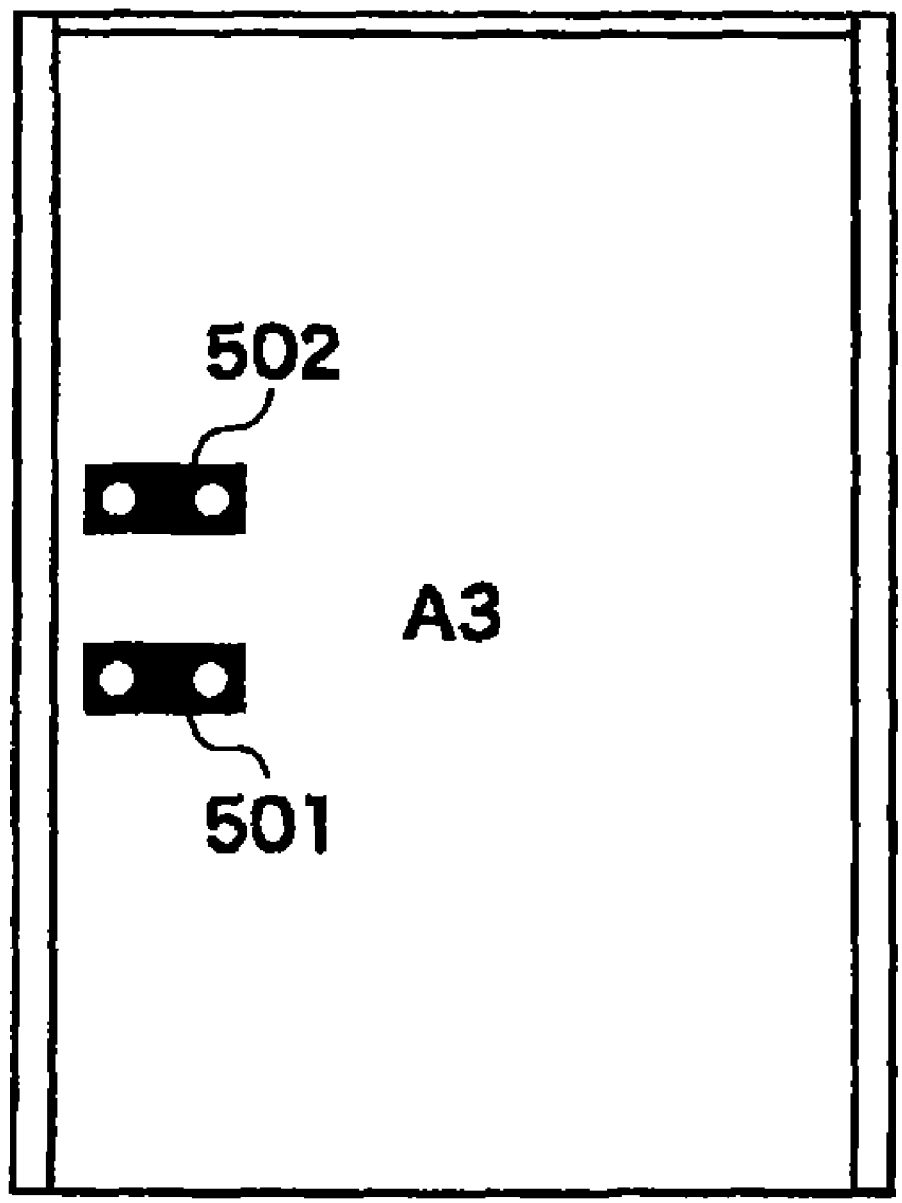

FIGS. 5A to 5C are top views of an original tray of FIG. 1.

Referring to FIG. 5A, original size sensors 501 and 502 are attached to the original tray 101. Therefore, a substantial sub-scanning length of the original 102 can be detected when a user stacks the originals 102.

The original size sensor 501 is disposed while separated by 200 mm away from an original leading-edge abutting position, and the original size sensor 502 is disposed while separated by 220 mm away from the original front-end abutting position. When only the original size sensor 501 determines that the original exists, it can be detected that the original sub-scanning length ranges from 200 mm to 220 mm (see FIG. 5B). When both the original size sensors 501 and 502 determine that the original exists, it can be detected that the original sub-scanning length is equal to or longer than 220 mm (see FIG. 5C).

The case in which the CIS line sensor 128 of FIG. 3 scans the original with RGB three colors and resolution of 600 dpi will be described below.

It is assumed that the A/D conversion circuit 303 converts the image data from the CIS line sensor 128 into the digital image data in which each of R, G, and B has eight bits (total of 24 bits) and the temporary storage memory 305 has a storage capacity of 128 Mbyte. The temporary storage memory 305 can store data relating to a maximum permissible sub-scanning original length of about 257 mm when a main scanning original size is 297 mm (in the embodiment, for the purpose of simplification the main scanning original size is fixed to 297 mm, however, in practice, the main scanning original size is not limited to 297 mm). A computation formula is expressed below.

maximum permissible sub-scanning length=(128 MB/297 mm)×(25.4/600 dpi)×(25.4/600 dpi)× (1/(3 colors×8 bits)).

Therefore, an A4 size image (sub-scanning length of 210 mm) can completely be stored in the temporary storage memory 305, while an A3 size image (sub-scanning length of 420 mm) cannot be stored in the temporary storage memory 305.

Figure 6:
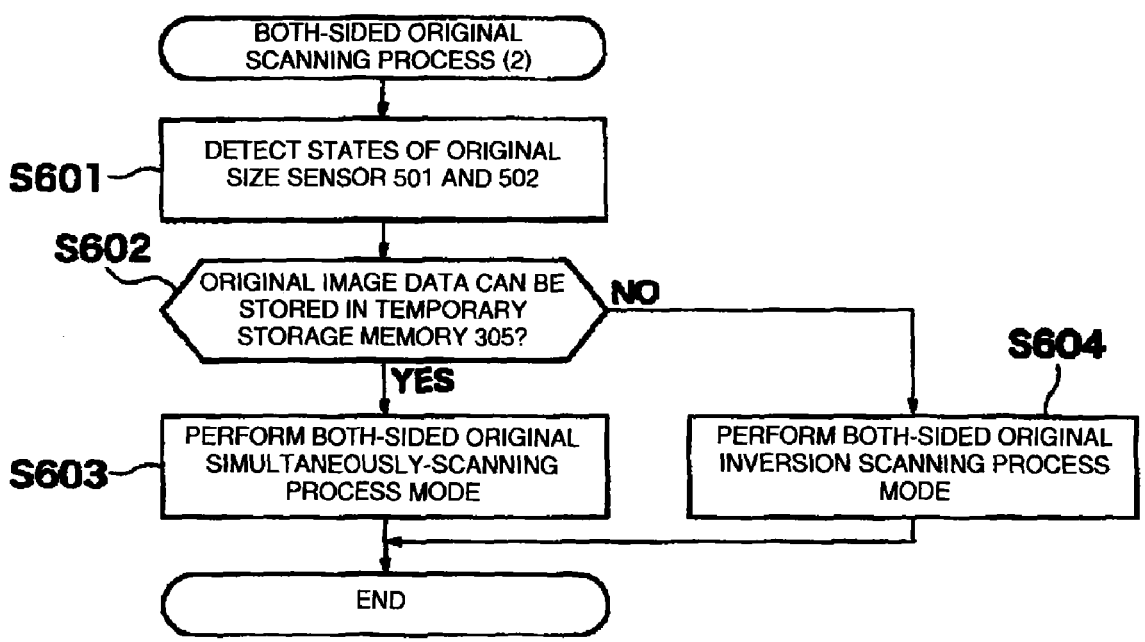
FIG. 6 is a flowchart illustrating a procedure of a both-sided original scanning process performed by the image scanner of FIG. 3 including the original tray of FIG. 5.

FIG. 6 is a flowchart illustrating a procedure of a both-sided original scanning process performed by the image scanner of FIG. 3 including the original tray of FIG. 5.

Referring to FIG. 6, when both-sided scan of the original is specified, states of the original size sensors 501 and 502 are detected, and an original sub-scanning length is detected (Step S601) (size detection unit). Then, it is determined whether or not the whole of the image data from the CIS line sensor 128 can be stored in the temporary storage memory 305 (Step S602) (size determination unit).

When it is determined that the whole of the image data can be stored in the temporary storage memory 305, the control unit 320 (see FIG. 9) performs a first mode (both-sided original simultaneously-scanning process mode) (Step S603). When it is determined that the whole of the image data cannot be stored in the temporary storage memory 305, the control unit 320 performs a second mode (both-sided original inversion scanning process mode) (Step S604), and the process is ended.

An operation of the both-sided simultaneously-scanning mode will be described.

First the motion of the original will be described during the both-sided simultaneously-scanning mode. The originals 102 stacked on the original tray 101 are sequentially conveyed from the uppermost original to the separation conveyance roller pair by the sheet-feeding roller 103. When the plural originals are conveyed while overlapping each other, the separation conveyance roller 104 and the separation conveyance driven roller 105 separate the originals one by one and convey the original.

The original leading edge of the separated one original is aligned by the registration roller pair located on the downstream side, the original passes through the lead roller pair, and the original is conveyed to a first scanner portion (surface scanner portion). Then, the original 102 passes through the lead discharge roller pair, the original is guided to a second scanner portion (backside scanner portion), and the original is conveyed to the discharge roller 113 and discharged to the discharge tray 114.

Figure 7:
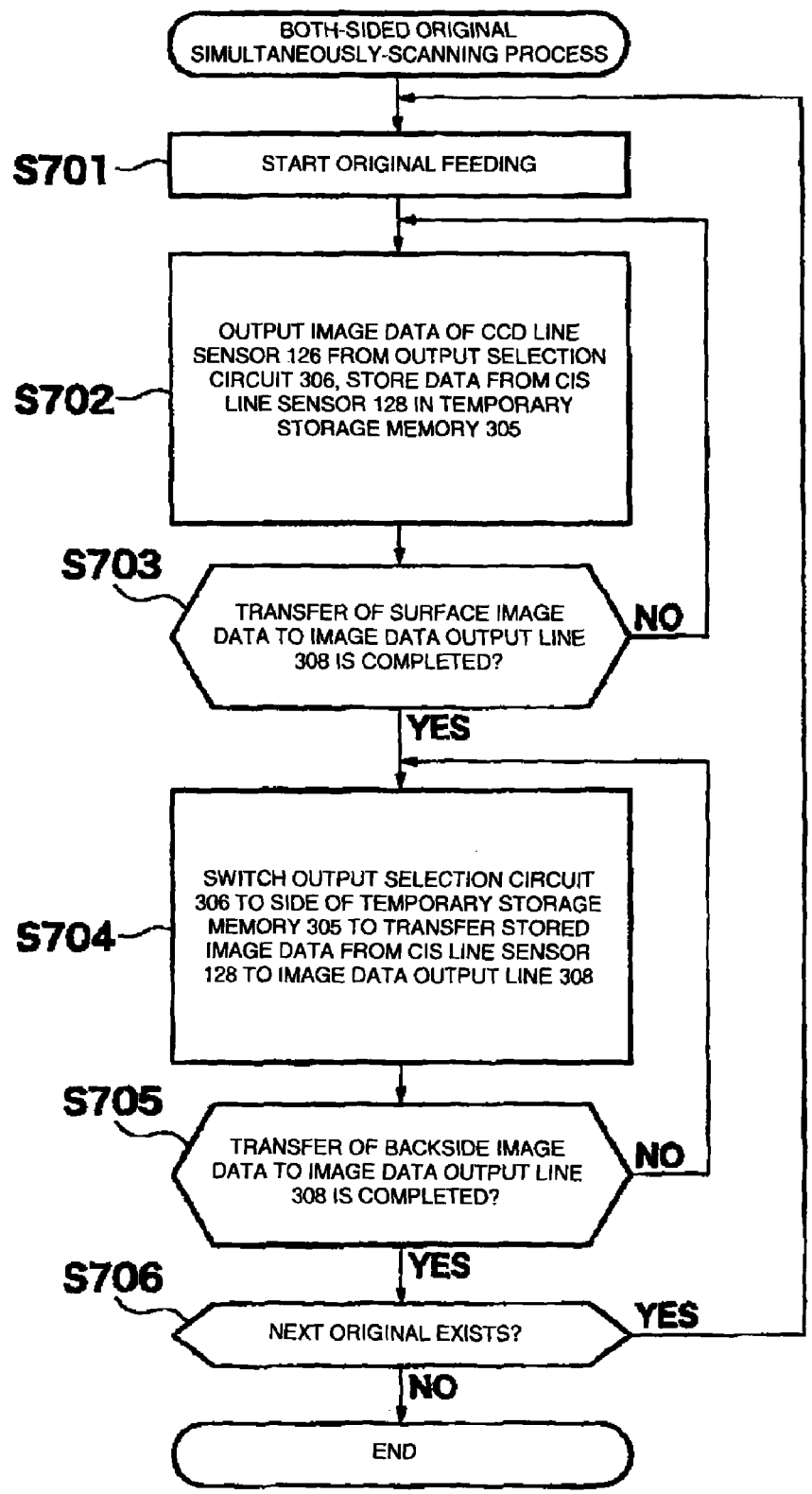
FIG. 7 is a flowchart illustrating a procedure of a both-sided original simultaneously-scanning process performed by the image scanner of FIG. 3.

FIG. 7 is a flowchart illustrating a procedure of a both-sided original simultaneously-scanning process (Step S603 of FIG. 6) performed by the image scanner of FIG. 3.

Referring to FIG. 7, when the original feeding is started, the image data of the CCD line sensor 126 is transferred from the output selection circuit 306 to the image data output line 308 (Step S701). The image data from the CIS line sensor 128 is stored in the temporary storage memory 305 (Step S702).

When the transfer of the image data from the CCD line sensor 126 to the image data output line 308 is completed (YES in Step S703), the output selection circuit 306 is switched. Then, the image data of the CIS line sensor 128, stored in the temporary storage memory 305, is transferred to the image data output line 308 (Step S704).

When the transfer of the image data from the CIS line sensor 128 to the image data output line 308 is completed (YES in Step S705), the flow goes to Step S706. In Step S706, it is determined whether or not the next original exists. When the next original exists (YES in Step S706), the transition is taken place to the next original scanning operation. When the next original does not exist (NO in Step S706), the both-sided simultaneously-scanning operation of the original is ended.

Then, an operation of an inversion both-sided scanning mode will be described. The motion of the original during the inversion both-sided scanning mode will be described below. The originals 102 stacked on the original tray 101 are sequentially conveyed from the uppermost original to the separation conveyance roller pair by the sheet-feeding roller 103. When the plural originals are conveyed while overlapping each other, the separation conveyance roller 104 and the separation conveyance driven roller 105 separate the originals one by one and convey the original.

The original leading edge of the separated one original is aligned by the registration roller pair located on the downstream side, the original passes through the lead roller pair, and the original is conveyed to the first scanner portion (surface scanner portion). Then, the original 102 passes through the lead discharge roller pair, the original is guided to the second scanner portion (backside scanner portion), and the original is conveyed to the discharge roller 113 (the original scan is not performed in the second scanner portion during the inversion both-sided scanning mode) and discharged to the discharge tray 114.

Then, the original 102 is delivered to an original inversion path 129, and switchback conveyance of the original 102 is performed toward the separation conveyance roller pair. The leading edge of the original 102 is aligned by the registration roller pair, and the original is conveyed to the first scanner portion.

At this point, the original 102 is inverted through the original inversion path 129. Then, the original 102 passes through the lead discharge roller pair, and the original is guided to the second scanner portion (backside scanner portion). Then, the original is conveyed to the discharge roller 113 and discharged to the discharge tray 114.

Figure 8:
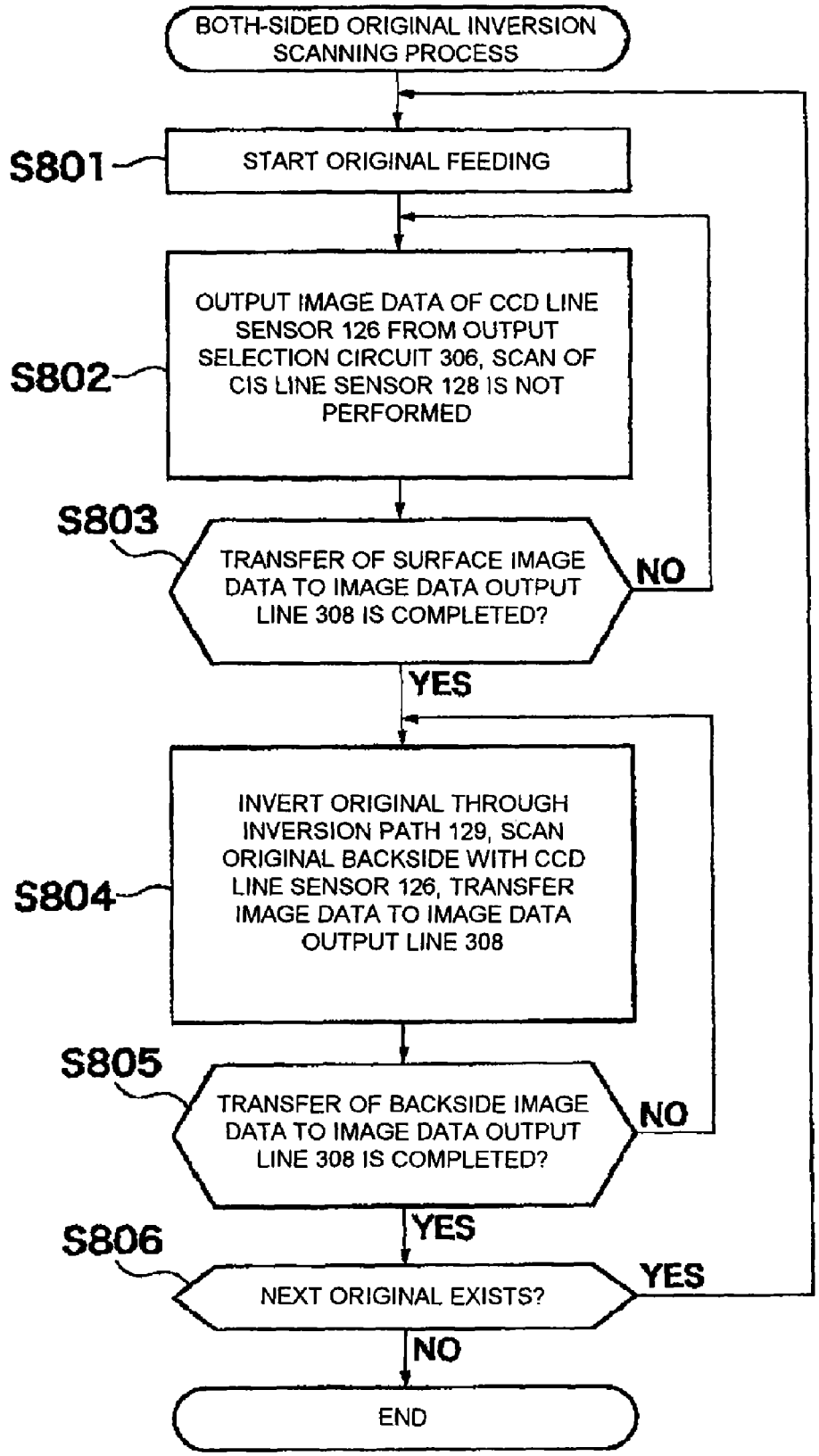
FIG. 8 is a flowchart illustrating a procedure of a both-sided original inversion scanning process performed by the image scanner of FIG. 3.

FIG. 8 is a flowchart illustrating a procedure of a both-sided original inversion scanning process (Step S604 of FIG. 6) performed by the image scanner of FIG. 3.

Referring to FIG. 8, when the original feeding is started (Step S801), the image data of the CCD line sensor 126 is transferred from the output selection circuit 306 to the image data output line 308 (Step S802). At this point, the scan of the CIS line sensor 128 is not performed.

When it is detected from the CCD line sensor 126 that the transfer of the image data of the original surface to the image data output line 308 is completed (YES in Step S803), the original is inverted through the inversion path 129, and the CCD line sensor 126 scans the backside of the original. Then, the image data is transferred to the image data output line 308 (Step S804).

When the transfer of the image data from the CCD line sensor 126 to the image data output line 308 is completed (YES in Step S805), the flow goes to Step S806. In Step S806, it is determined whether or not the next original exists. When the next original exists (YES in Step S806), the next original is fed to take place the transition to the next original scanning operation. When the next original does not exist (NO in Step S806), the both-sided simultaneously-scanning operation of the original is ended.

Figure 9:
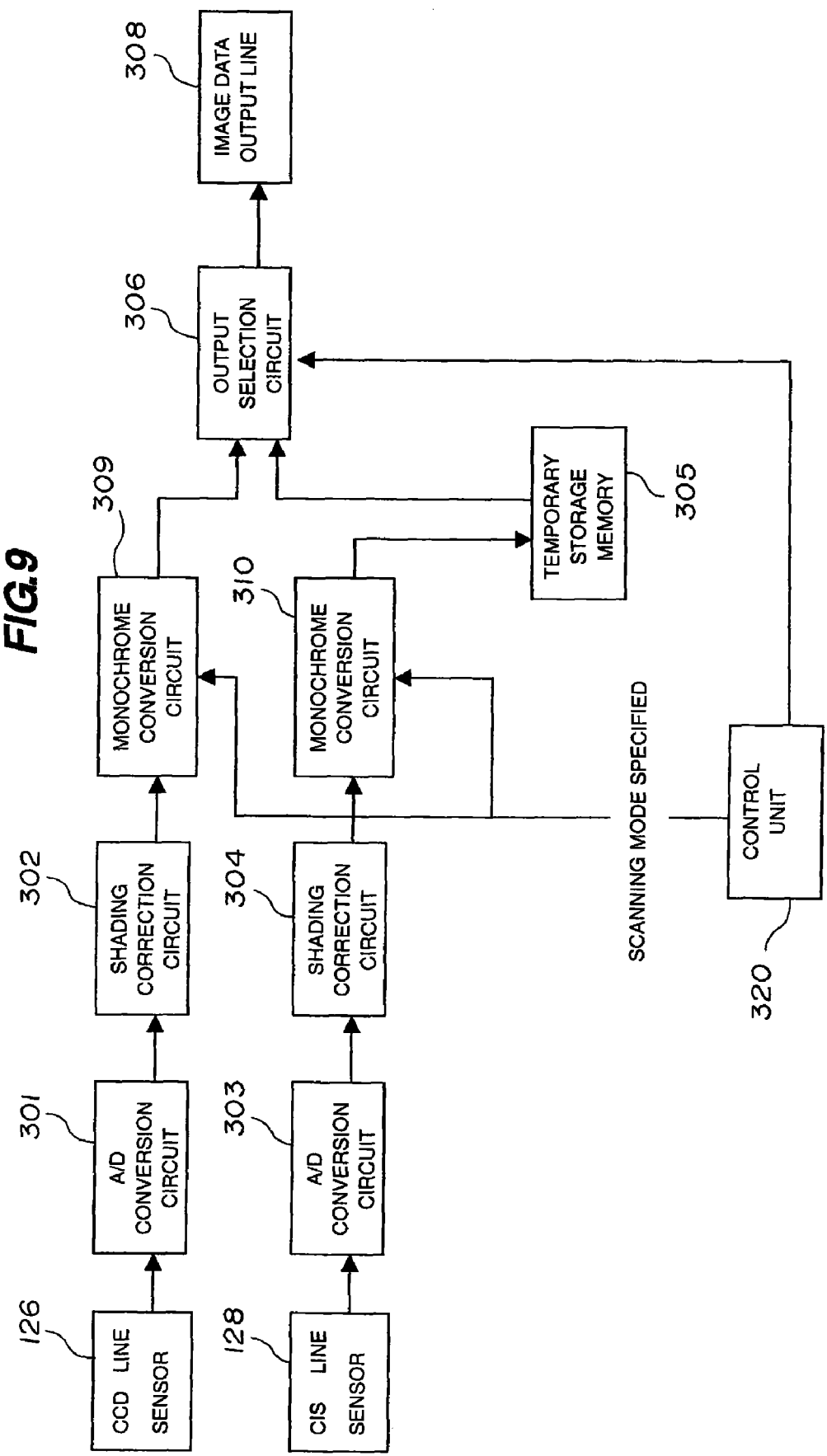
FIG. 9 illustrates a block diagram of an image scanner according to a second embodiment of the invention.

FIG. 9 illustrates a block diagram of an image scanner according to a second embodiment of the invention.

Referring to FIG. 9, the image scanner includes the A/D conversion circuit 301 which converts the analog signal from the CCD line sensor 126 into the digital signal in which each of R, G, and B has eight bits. The image scanner includes the shading correction circuit 302 which performs the shading correction to the image data converted into the digital value by the A/D conversion circuit 301.

The image scanner includes a monochrome conversion circuit 309 which converts the shading-corrected color image data in which each of R, G, and B has eight bits (total of 24 bits) into an 8-bit monochrome image.

The following computation formula is used in the conversion into the monochrome image.

$$\text{monochrome image value} = ((R \times X) + (G \times Y) + (B \times Z))/3,$$

where X, Y, Z are weighting coefficients.

The weighting of each color can be changed by the weighting coefficients X, Y, and Z. Although various methods of converting the R, G, and B image into the monochrome image have been proposed, the above simple computation formula is adopted in the invention for the purpose of simplification.

The monochrome conversion circuit 309 directly outputs the color image data in which each of R, G, and B has eight bits (total of 24 bits) to the post-stage according to the scanning mode specified by the user. The monochrome conversion circuit 309 also outputs the image data converted into the monochrome image to the post-stage. The monochrome conversion circuit 309 can switch the both.

The image scanner includes the A/D conversion circuit 303 and the shading correction circuit 304. The A/D conversion circuit 303 converts the analog signal from the CIS line sensor 128 into the digital signal. The shading correction circuit 304 performs the shading correction to the image data which is converted into the digital value by the A/D conversion circuit 303. The image scanner includes a monochrome conversion circuit 310 which performs the operation similar to that of the monochrome conversion circuit 309.

The image scanner includes the temporary storage memory 305 and the output selection circuit 306. The image data from the CIS line sensor 128, outputted from the monochrome conversion circuit 310, is temporarily stored in the temporary storage memory 305. The output selection circuit 306 selects whether the image data from the CCD line sensor 126 is transferred to an image data output line 308 or the image data from the CIS line sensor 128, stored in the temporary storage memory 305, is transferred to the image data output line 308.

It is assumed that the CIS line sensor 128 scans the original with resolution of 600 dpi while the user specifies the monochrome scanning mode. In this case, the monochrome conversion circuit 310 converts the image data from the CIS line sensor 128 into 8-bit monochrome image data.

It is assumed that the temporary storage memory 305 has the storage capacity of 128 Mbyte. In this case, the temporary storage memory 305 has the maximum permissible sub-scanning original length of about 771 mm when the main scanning original size is 297 mm. In the second embodiment the main scanning original size is fixed to 297 mm. However, the main scanning original size is not limited to 297 mm in practice and may vary in other embodiments. A computation formula is expressed below.

maximum permissible sub-scanning length=(128 MB/297 mm)×(25.4/600 dpi)×(25.4/600 dpi) (1/(1 color×8 bits)

Therefore, in the monochrome scanning mode, both the A4 size (sub-scanning length of 210 mm) and the A3 size (sub-scanning length of 420 mm) can completely be stored in the temporary storage memory 305.

Assuming that the same conditions are set when the CIS line sensor 128 scans the original with resolution of 600 dpi while the user specifies the color-scanning mode, the temporary storage memory 305 has the maximum permissible sub-scanning original length of about 257 mm. In the case of the color-scanning mode, the image data becomes the total of 24 bits in which each of R, G, and B has eight bits, and the image data capacity becomes three times the monochrome scanning mode. A computation formula is expressed as follows.

maximum permissible sub-scanning length=(128 MB/297 mm)×(25.4/600 dpi)×(25.4/600 dpi)× (1/(3 colors×8 bits)).

Therefore, the A4 size (sub-scanning length of 210 mm) can completely be stored in the temporary storage memory 305, while the A3 size (sub-scanning length of 420 mm) cannot be stored in the temporary storage memory 305. As a result, the original size which can be stored in the temporary storage memory 305 is changed according to the scanning mode specified by the user.

Figure 10:
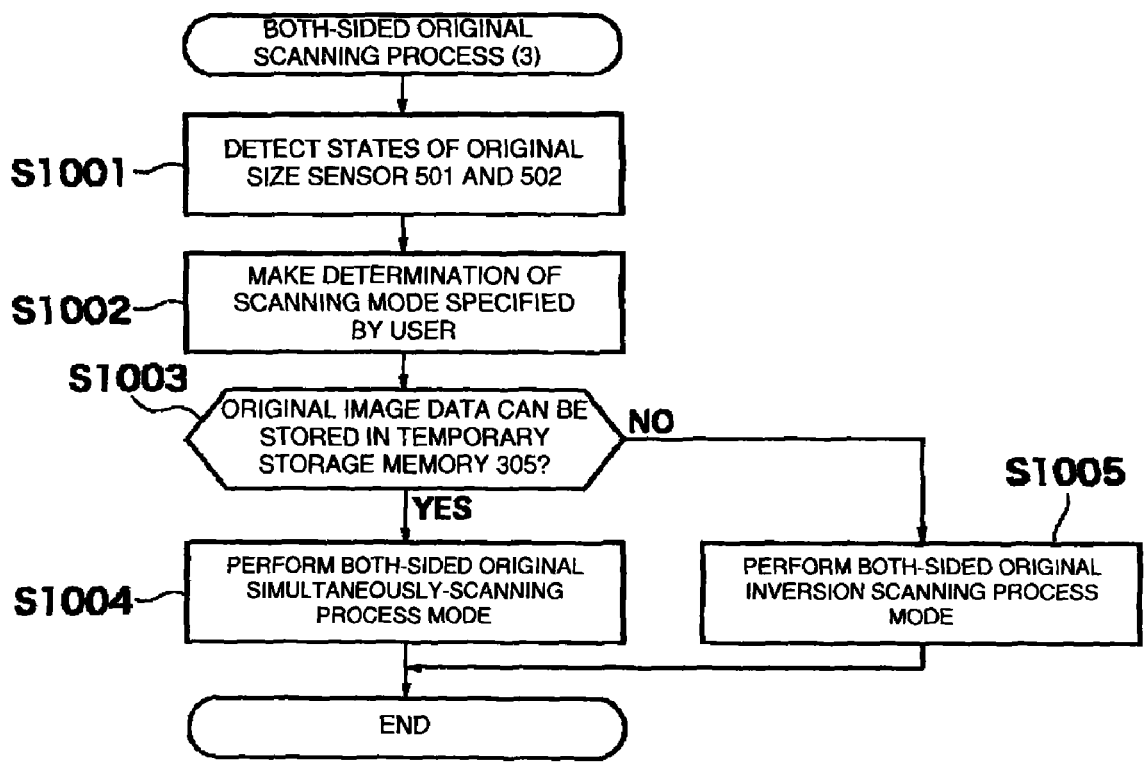
FIG. 10 is a flowchart illustrating a procedure of a both-sided original scanning process performed by the image scanner of FIG. 9 including the original tray of FIG. 5.

FIG. 10 is a flowchart illustrating a procedure of a both-sided original scanning process performed by the image scanner of FIG. 9 including the original tray of FIG. 5.

Referring to FIG. 10, in specifying the both-sided scan of the original, the original size sensors 501 and 502 detect the original sub-scanning length (Step S1001) (size detection unit). It is determined whether the scanning mode specified by the user is the color scanning mode or the monochrome scanning mode (Step S1002) (mode specification unit).

From the above information, it is determined whether or not the image data from the CIS line sensor 128 can completely be stored in the temporary storage memory 305 (Step S1003) (size determination unit).

When it is determined that the image data can completely be stored in the temporary storage memory 305, the both-sided original simultaneously-scanning process mode is performed (Step S1004). When it is determined that the image data cannot completely be stored in the temporary storage memory 305, the inversion both-sided scanning mode is performed (Step S1005), and the process is ended. The subsequent original scanning operations are not repeated here because the operations are identical to those of the first embodiment.

A further embodiment of the present invention provides an image scanner (100,123) comprising:

a first original scanning unit (116, 126) which scans a first surface of an original (102);

a second original scanning unit (130,128) which scans a second surface of the original (102);

a conveyance path in which the first and second original scanning units (116, 126 and 130, 128) are disposed;

an original inversion unit (129, 113) which inverts the original passing through the conveyance path, the original inversion unit guiding the original (102) to the conveyance path again while the original (102) is inverted;

a storage unit (305) which can retain pieces of image data of at least one of the original scanning units (116, 126 or 130, 128);

a size detection unit (501,502,S602) which detects an original size; and a size determination unit (501,502,S603) which determines; and whether or not the original size detected by the size detection unit (501,502,S602) can be stored in the storage unit (305);

characterized in that the image scanner further comprises a control unit (320) which takes place transition to a first mode when the size determination unit determines that the original size can be stored in the storage unit (305), the first and second original scanning units (116, 126 and 130, 128) respectively scanning the first surface and the second surface of the original passing through the conveyance path, and the control unit (320) which takes place transition to a second mode when the size determination unit determines that the original size cannot be stored in the storage unit (305), the first original scanning unit (116,126) scanning the first surface of the original and the first original scanning unit (116, 126) scanning the second surface of the original inverted by the original inversion unit (129, 113).

A further embodiment of the present invention provides an image scanner (100,123) comprising:

a first original scanning unit (116, 126) which scans a first surface of an original (102);

a second original scanning unit (130,128) which scans a second surface of the original (102);

a conveyance path in which the first and second original scanning units (116, 126 and 130, 128) are disposed;

an original inversion unit (129, 113) which inverts the original passing through the conveyance path, the original inversion unit guiding the original to the conveyance path again while the original (102) is inverted;

a storage unit (305) which can retain pieces of image data of at least one of the original scanning units (116, 126 or 130, 128);

a size detection unit (501,502,S602) which detects an original size;

a mode specification unit (309,310,S1002) which specifies a color scanning mode or a monochrome scanning mode; and a size determination unit (501,502,S603) which determines whether or not the original size can be stored in the storage unit (305) based on the pieces of information from the size detection unit (501,502,S602) and the mode specification unit (309,310,S1002);

characterized in that the image scanner further comprises a control unit (320) which takes place transition to a first mode when the size determination unit (501,502,S603) determines that the original size can be stored in the storage unit (305), the first and second original scanning units (116, 126 and 130, 128) respectively scanning the first surface and the second surface of the original passing through the conveyance path, and the control unit (320) which takes place transition to a second mode when the size determination unit determines that the original size cannot be stored in the storage unit (305), the first original scanning unit scanning (116, 126) the first surface of the original and the first original scanning unit (116, 126) scanning the second surface of the original inverted by the original inversion unit (129,113).

A further embodiment of the present invention provides an image scanner (100,123) comprising:

a first original scanning unit (116, 126) which scans a first surface of an original (102);

a second original scanning unit (130, 128) which scans a second surface of the original (102);

a conveyance path in which the first and second original scanning units (116, 126 and 130, 128) are disposed;

an original inversion unit (129,113) which inverts the original (102) passing through the conveyance path, the original inversion unit (129,113) guiding the original to the conveyance path again while the original (102) is inverted;

a control unit (320) which controls conveyance and inversion of the original (102);

a storage unit (305) which can retain pieces of scanned image data of at least one of the original scanning units (116, 126 or 130, 128); and a transfer unit which selectively transfers scanning image data of one of the first and second original scanning unit to a data transfer line (308), characterized in that when the control unit (320) detects that an image data capacity of the image data is not lower than a predetermined value with respect to a residual storage capacity of the storage unit (305), after the pieces of scanned image data of one of the first and second original scanning units (116, 126 or 130, 128) is transferred to the data transfer line (308), the control unit (320) causes the original inversion unit (129,113) to invert the original, the control unit (320) causes one of the first and second original scanning units (116, 126 and 130, 128) to scan the other original surface, and the control unit (320) transfers the scanned image data to the data transfer line.

A further embodiment of the present invention provides a method of controlling an image scanner (100,123) which includes:

a first original scanning unit (116, 126) which scans a first surface of an original (102);

a second original scanning unit (130, 128) which scans a second surface of the original (102);

a conveyance path in which the first and second original scanning units (116, 126 and 130, 128) are disposed;

an original inversion unit (129,113) which inverts the original (102) passing through the conveyance path, the original inversion unit (129,113) guiding the original (102) to the conveyance path again while the original (102) is inverted; and a storage unit (305) which can retain pieces of image data of at least one of the original scanning units (116, 126 or 130, 128), characterized in that the image scanner control method having steps of:

detecting an original size;

determining whether or not the detected original size can be stored in the storage unit;

taking place transition to a first mode when it is determined that the original size can be stored in the storage unit, the first and second original scanning units respectively scanning the first surface and the second surface of the original passing through the conveyance path; and taking place transition to a second mode when it is determined that the original size cannot be stored in the storage unit, the first original scanning unit scanning the first surface of the original and the first original scanning unit scanning the second surface of the original inverted by the original inversion unit.

A further embodiment of the present invention provides a method of controlling an image scanner (100,123) which includes:

a first scanning means (116, 126) which scans a first surface of an original (102);

a second scanning means (130, 128) which scans a second surface of the original (102);

a conveyance path in which the first and second scanning means (116, 126 and 130, 128) are disposed;

an inversion means (129, 113) which inverts the original passing through the conveyance path, the inversion means (129, 113) guiding the original to the conveyance path again while the original (102) is inverted;

a storage means (305) which can retain pieces of image data of at least one of the scanning means, wherein the image-scanner control method having steps of:

detecting an original size;

specifying a color scanning mode or a monochrome scanning mode;

determining whether or not the original size can be stored in the storage means based on the pieces of information on the detected original size and the specified mode;

taking place transition to a first mode when it is determined that the original size can be stored in the storage means, the first and second scanning means respectively scanning the first surface and the second surface of the original passing through the conveyance path; and taking place transition to a second mode when it is determined that the original size cannot be stored in the storage means, the first scanning means scanning the first surface of the original and the first scanning means scanning the second surface of the original inverted by the inversion means.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-259050, filed Sep. 25, 2006, which is hereby incorporated by reference herein in its entirety.

What is claimed is:

1. An image scanner comprising:
   a first scanning unit arranged to scan a first surface of an original;
   a second scanning unit arranged to scan a second surface of the original;
   a conveyance path along which the first and second scanning unit are disposed;
   an inversion unit operable to invert an original passing through the conveyance path, the inversion unit being operable to guide the inverted original to pass through at least part of the conveyance path again;
   a storage unit configured to store image data from the first scanning unit and the second scanning unit;
   a size detection unit configured to detect an original size, and
   a selection unit configured to alternatively select one of a first mode and a second mode in accordance with the size detected by the size detection unit, wherein
   when the detected size of the image data is able to be stored in the storage unit, the first mode is selected and the first and second scanning unit respectively scan the first surface and the second surface of an original passing through the conveyance path without inverting the original and
   when the detected size of the image data is not able to be stored in the storage unit, the second mode is selected and the first scanning unit scans the first surface of the original passing through the conveyance path and the first scanning unit scans the second surface of the original, the first surface of which having been scanned by the first scanning unit, inverted by the inversion unit.

2. An image scanner according to claim 1, wherein the selection unit selects the first mode in a case where the size detected by the size detection unit is determined as the image data scanned by the second scanning unit can be stored in the storage unit and selects the second mode in a case where the size detected by the size detection unit is determined as the image data scanned by the second scanning unit cannot be stored in the storage unit.

3. An image scanner according to claim 1, further comprising
a determination unit configured to determine a scanning mode is a color scanning mode or a monochrome scanning mode,
wherein the selection unit selects the first mode or the second mode in accordance with the size detected by the size detection unit and the scanning mode determined by the determination unit.

4. An image scanner according to claim 3, wherein the selection unit selects the first mode in a case where a combination the size detected by the size detection unit and the scanning mode determined by the determination unit is determined as the image data scanned by the second scanning unit can be stored in the storage unit and selects the second mode in a case where the combination the size detected by the size detection unit and the scanning mode determined by the determination unit is determined as the image data scanned by the second scanning unit cannot be stored in the storage unit.

5. An image scanner according to claim 1, further comprising a transfer unit configured to transfer the image data scanned by the first scanning unit and the second scanning unit,
wherein the transfer unit, in the first mode, transfers the image data scanned by the first scanning unit while the storage unit stores the image data scanned by the second scanning unit and transfers the image data stored in the storage unit after the image data scanned by the first scanning unit is transferred.

6. An image scanner according to claim 1,
wherein the first scanning unit and the second scanning unit are able to scan for outputting color images.

\* \* \* \* \*